US009176492B2

(12) United States Patent
Sandler

(10) Patent No.: US 9,176,492 B2
(45) Date of Patent: Nov. 3, 2015

(54) TECHNIQUES FOR CONFIGURING PHYSICAL SPACES

(71) Applicant: Lyle Howard Sandler, Morganville, NJ (US)

(72) Inventor: Lyle Howard Sandler, Morganville, NJ (US)

(73) Assignee: NCR Corporation, Duluth, GA (US)

(*) Notice: Subject to any disclaimer, the term of this patent is extended or adjusted under 35 U.S.C. 154(b) by 482 days.

(21) Appl. No.: 13/739,500

(22) Filed: Jan. 11, 2013

(65) Prior Publication Data
US 2013/0178951 A1 Jul. 11, 2013

Related U.S. Application Data

(60) Provisional application No. 61/585,309, filed on Jan. 11, 2012.

(51) Int. Cl.
G05B 11/01 (2006.01)
G06Q 10/00 (2012.01)
G06Q 30/00 (2012.01)
B66B 9/00 (2006.01)
E04H 6/06 (2006.01)
A47F 10/00 (2006.01)
E04H 1/00 (2006.01)
E05F 15/20 (2006.01)
E05F 11/00 (2006.01)
G05B 19/02 (2006.01)
E04B 2/82 (2006.01)
G05B 15/02 (2006.01)

(52) U.S. Cl.
CPC ............... *G05B 19/02* (2013.01); *E04B 2/827* (2013.01); *G05B 15/02* (2013.01); *G05B 2219/2642* (2013.01)

(58) Field of Classification Search
CPC .............. G06Q 10/06; G06Q 10/0631; G06Q 10/06313; G06Q 10/0637; G06Q 30/02; G06Q 30/0237; E05Y 2201/434; E05Y 2900/142; E04B 2/827; E05F 15/70; Y10S 706/923
USPC .............. 700/11–14, 95, 97; 703/1; 705/7.11, 705/7.12, 7.23, 7.36, 14.1, 14.37, 14.38, 705/14.4, 14.49, 14.65; 706/919–921, 923; 52/27, 29, 36.1, 64; 160/1, 7, 84.01, 160/84.02, 84.06, 130, 181, 188, 201, 405
See application file for complete search history.

(56) References Cited

U.S. PATENT DOCUMENTS

| 4,685,255 | A | * | 8/1987 | Kelley | ............................ 52/36.1 |
| 5,189,606 | A | * | 2/1993 | Burns et al. | ................... 705/7.23 |
| 5,358,023 | A | * | 10/1994 | Owens | .......................... 160/199 |
| 6,526,702 | B2 | * | 3/2003 | Jones | ................................ 52/64 |

(Continued)

*Primary Examiner* — Crystal J Barnes-Bullock
(74) *Attorney, Agent, or Firm* — Joseph P. Mehrle

(57) ABSTRACT

Techniques for configuring physical spaces are provided. Walls of a physical space are selectively engaged on tracks and sectioned. The walls include integrated devices to receive instructions and automatically reconfigure themselves into custom defined spaces by moving along the tracks in accordance with the instructions. Moreover, the walls selectively include integrated media devices that receive instructions to present custom information and to provide interactive custom services. The instructions can be customized and dynamically delivered to the walls and the media devices on demand to alter the physical space of an establishment along with altering the presented information and provided services of the establishment.

20 Claims, 3 Drawing Sheets

(56) References Cited

U.S. PATENT DOCUMENTS

| | | | |
|---|---|---|---|
| 7,835,810 B2* | 11/2010 | Mifsud et al. | 700/98 |
| 8,443,866 B2* | 5/2013 | Goodman | 160/84.02 |
| 8,534,341 B2* | 9/2013 | Coleman et al. | 160/84.02 |
| 8,954,190 B2* | 2/2015 | Braunstein | 700/242 |
| 2004/0210479 A1* | 10/2004 | Perkowski et al. | 705/14 |
| 2008/0168741 A1* | 7/2008 | Gilgan et al. | 52/745.19 |
| 2011/0093095 A1* | 4/2011 | Goodman et al. | 700/13 |
| 2014/0163703 A1* | 6/2014 | Chang et al. | 700/90 |

\* cited by examiner

# TECHNIQUES FOR CONFIGURING PHYSICAL SPACES

RELATED APPLICATIONS

The present application is co-pending with, a non-provisional to, and claims priority to U.S. Provisional Application No. 61/585,309 entitled: "Techniques for Branch Bank Layout," filed on Jan. 11, 2012; the disclosure of which in its entirety is incorporated by reference herein.

BACKGROUND

Technology advancements are pervasive in modern society. Capabilities associated with processing data, storing data, and networking devices keep improving daily. Enterprises have taken advantage of the technology advancements along with the corresponding new consumer devices to transact, track, and communicate with their customers.

Most, but not necessarily all, of the business methodologies that enterprises use for engaging customers via technology occur while the customers are away from brick-and-mortar establishments of those enterprises. Moreover, the methodologies that are used to engage a customer while the customer is at a brick-and-mortar establishment are related to conclude a transaction, such as via a kiosk or kiosk-type device (phone of the consumer).

Very little if any enterprise uses technology to customize the physical experience that a customer has while at a brick-and-mortar store. This situation is less than ideal because brick-and-mortar stores are struggling to stay profitable in the wake of hyper competition from online stores. Most brick-and-mortar stores have become showcases where customers go to look and demo products, which the customers subsequently buy online for a far cheaper price.

Still further, service oriented brick-and-mortar stores are increasingly competing for the attention and loyalty of customers as more and more service-oriented businesses spring up and specialize in niche areas of the market.

Enterprises have heretofore not utilized technology to enhance the physical space and utility of their brick-and-mortar stores. Yet, improvements in this area have the potential to increase customer traffic, increase customer loyalty, and increase revenue generated from customers for an enterprise.

SUMMARY

In various embodiments, techniques for configuring physical spaces are presented. According to an embodiment, a method for automatically configuring a physical space is provided.

Specifically, an instruction is received to configure a physical space having multiple walls into a target configuration from an existing configuration. Next, devices associated with the walls are directed to move selective walls along tracks to achieve the target configuration. Finally, media devices embedded in or affixed to portions of selective walls are directed to present custom information consistent with the target configuration.

DETAILED DESCRIPTION

Figure 1:
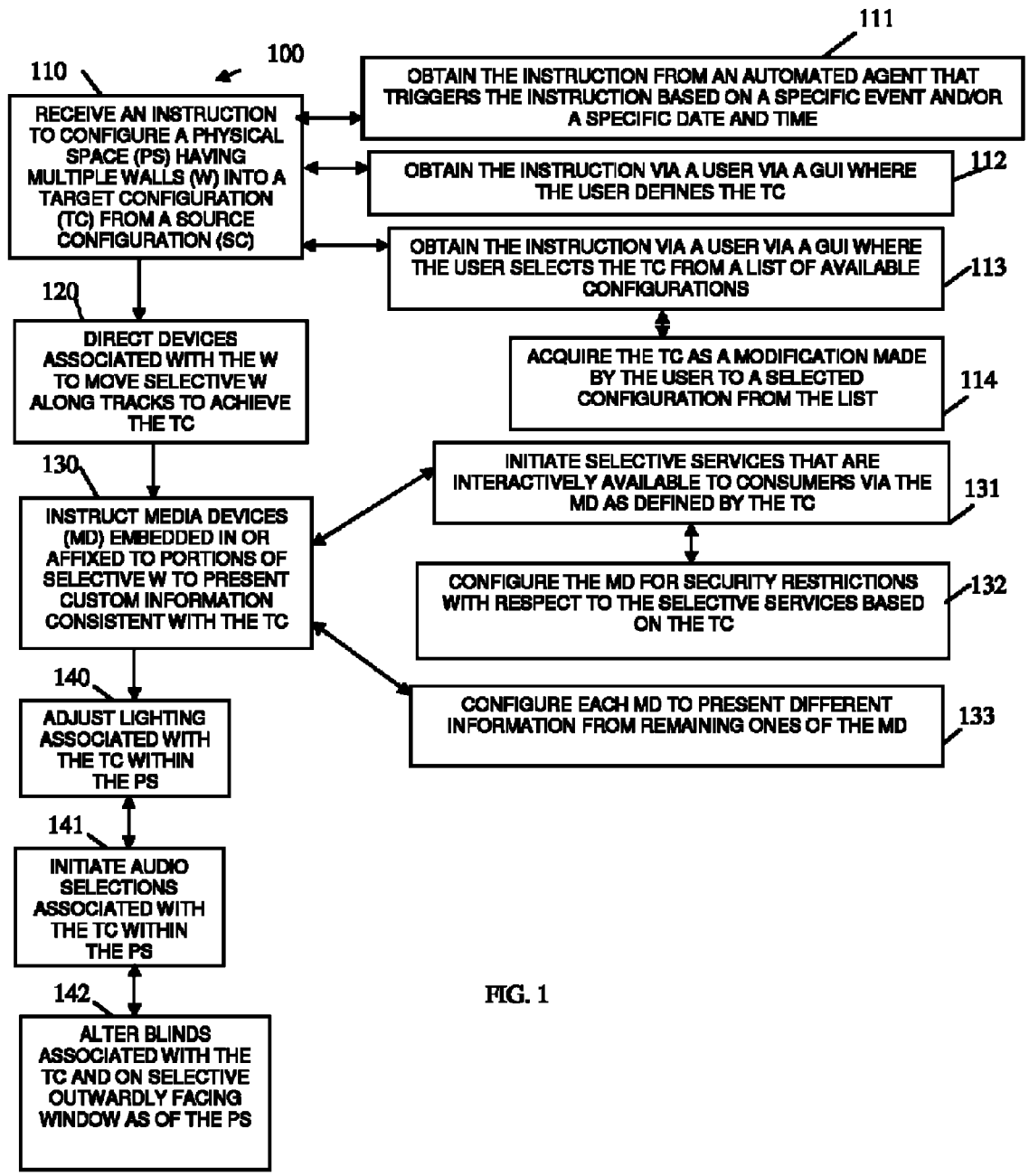
FIG. 1 is a diagram of a method for automatically configuring a physical space, according to an example embodiment.

FIG. 1 is a diagram of a method 100 for automatically configuring a physical space, according to an example embodiment. The method 100 (hereinafter "space configuration manager") is implemented as instructions programmed and residing within memory and/or on a non-transitory computer-readable (processor-readable) storage medium and executed by one or more processors. The processors are specifically configured and programmed to process the space configuration manager. The space configuration manager may also operate over a network. The network is wired, wireless, or a combination of wired and wireless.

The space configuration manager executes on one or more processors. The processors may be distributed over a network to interact with devices within a specific geographical location. In an embodiment, the processors are at least partially accessible via a cloud or server-based environment.

At 110, the space configuration manager receives an instruction to configure a physical space having multiple walls into a target configuration from an existing source configuration. That is, the instruction is a series of sub instructions defining the order and timing of wall movements to achieve the desired target configuration. The walls are sectioned and fit together or can exist independent of one another and move via hinges in the walls and tracks. The tracks can be lined discretely along the floor and/or can exist along the ceiling. The hinges and the walls include devices that are integrated into or coupled to the hinges and the walls to process the sub instructions and to physically move the hinges and the walls to the target configuration.

In an embodiment, the physical space is associated with a branch bank and the target configuration is a desired layout for the branch bank at a specific time of day occurring on a specific calendar date.

The instruction for causing the physical space to be reconfigured automatically (without manual intervention) can be received in a variety of manners.

For example, in one case, at 111, the space configuration manager obtains the instruction from an automated agent that triggers the instruction based on a specific event and/or specific date and time. In other words, the automated agent is configured to send the space configuration manager the instruction to cause the desired configuration based on some predefined event (promotion, calendar date, time of day, etc.).

In another case, at 112, the space configuration manager obtains the instruction via user that is interacting with a graphical user interface (GUI) acting as a front-end to the space configuration manager. Here, the user defines the target configuration from scratch. So, the user can process the GUI to custom define the physical space by defining the target configuration and causing the target configuration to be sent to the space configuration manager.

In yet another situation, at 113, the space configuration manager obtains the instruction from the user via a GUI but here the user selects the target configuration from a list of available configurations.

Continuing with the embodiment of 113 and at 114, the space configuration manager acquires the target configuration as a modification made by the user to a selected configuration from the list.`

So, based on 111-114, the space configuration manager can receive the instruction for the target from an automated agent or from a user. The user custom defines the target configuration, selects it from a predefined list, or modifies it from a selection made from the list.

At 120, the space configuration manager directs devices associated with the walls to move selective walls or portions of walls along tracks and/or hinges to achieve the desired target configuration within the physical space.

At 130, the space configuration manager instructs media devices embedded in or affixed to portions of selective walls to present custom information consistent with the target configuration. In an embodiment, the media devices include tablets, laptops, desktops, televisions, money stations, other kiosks, and the like. Again, the media devices are embedded or affixed to the walls.

According to an embodiment, at 131, the space configuration manager initiates selective services that are interactively available to consumers via the media devices as defined by the target configuration. So, tablets or laptops are loaded with services that consumers can interactively use based on the target configuration.

Continuing with the embodiment of 131 and at 132, the space configuration manager configures the media devices for security restrictions with respect to the selective services based on the target configuration. Here, only limited features of the services and only the defined services are accessible to the consumers on the media devices for security reasons.

In an embodiment, at 133, the space configuration manager configures each media device to present different information from remaining ones of the media devices. So, one media device may be playing a video, while another offers kiosk services, and still another displays an advertisement. In some cases, the information can fit together so, one media device presents one aspect of an ad while another presents another portion of that ad.

According to an embodiment, at 140, the space configuration manager adjusts lighting associated with the target configuration within the physical space. Temperature can be adjusted as well.

Continuing with the embodiment of 140 and at 141, the space configuration manager initiates audio selections associated with the target configuration within the physical space. This can be informational audio or background music.

Still continuing with the embodiment of 141 and at 142, the space configuration manager alters blinds associated with the target configuration, the blinds appearing on selectively outwardly facing windows of the physical space. So, during different times of the year and for a given time of day, the window blinds are automatically adjusted. It is noted that the walls may have windows with blinds as well and based on the target configuration can be closed to provide privacy within a sub room associated with the target configuration.

Figure 2:
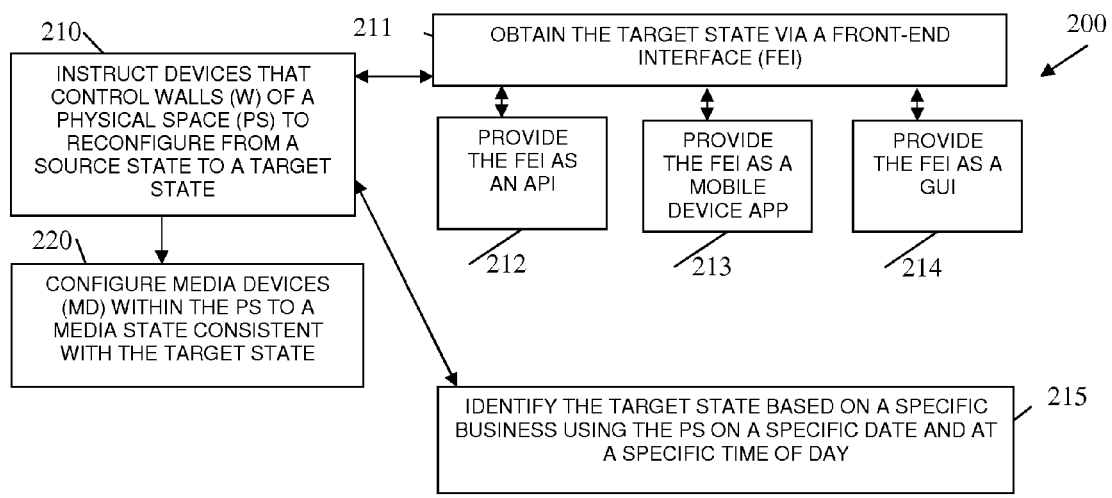
FIG. 2 is a diagram of another method for automatically configuring a physical space, according to an example embodiment.

FIG. 2 is a diagram of another method 200 for automatically configuring a physical space, according to an example embodiment. The method 200 (hereinafter "space controller") is implemented as instruction and programmed within memory and/or on a non-transitory computer-readable (processor-readable) storage medium that executes on one or more processors; the processors are specifically configured to execute the space controller. The space controller may also be operational over a network; the network is wired, wireless, or a combination of wired and wireless.

The space controller presents another and in some ways enhanced processing perspective of the space configuration manager represented by the method 100 and discussed above with reference to the FIG. 1.

At 210, the space controller instructs devices that control walls of a physical space to reconfigure from a source state to a target space. Again, the walls (or some select walls) move along tracks that can be hung on the floor and/or the ceiling of the physical space. Devices integrated into the walls or engaged with the walls are directed to move the walls to the target space. The timing and order of the movements are controlled based on the source state and the desired target space. Moreover, some walls can be bent to form tables or archways and other structures along hinges. In such cases, these hinges include devices receptive to the instructions of the space controller to achieve the desired configuration.

In an embodiment, at 211, the space controller obtains the target state via a front-end interface that communicates with the space controller over a network connection (can be WiFi, cellular, Bluetooth, Radio Frequency, Near Field Communication (NFC), Ethernet, and others).

Continuing with the embodiment of 211 and at 212, the space controller provides the front-end interface as an Application Programming Interface (API). This permits automated services to define the target state and to decide when and under what conditions the instruction to move from the source state to the target state is sent to the space controller.

In another instance of 211 and at 213, the space controller provides the front-end interface as a mobile device app. So, an administrator or employee of an enterprise can have an app on a tablet or phone that defines the target state and sends the target state instruction for transition from the source state to the space controller. Obviously security is enforced in such a scenario to prevent chaos with unauthorized requests to reconfigure the physical space.

In yet another circumstance of 211 and at 214, the space controller provides the front-end interface as a GUI, which an authorized user can access via any processing device to define the target state and initiate the instruction to transition from the source state to the target state; the instruction sent to the space controller.

According to an embodiment, at 215, the space controller identifies the target state based on a specific business using the physical space on a specific calendar date and at a specific time of day.

At 220, the space controller configures media devices within the physical space to a media state that is consistent with the target state. Such a situation was discussed above with reference to the FIG. 1.

Figure 3:
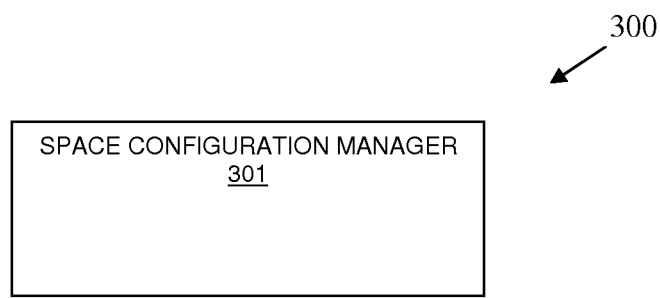
FIG. 3 is a diagram of an automated physical space configuration system, according to an example embodiment.

FIG. 3 is a diagram of an automated physical space configuration system 300, according to an example embodiment. The components of the automated physical space configuration system 300 are implemented as executable instructions and programmed within memory and/or a non-transitory computer-readable (processor-readable) storage medium that execute on one or more processors; the processors of the automated physical space configuration system 300 are specifically configured to execute the components of the automated physical space configuration system 300. The automated physical space configuration system 300 may also be operational over a network; the network is wired, wireless, or a combination of wired and wireless.

The automated physical space configuration system 300 includes a space configuration manager 301.

The automated physical space configuration system 300 includes a one or more processors having memory and/or non-transitory computer-readable media programmed with executable instructions that represent the space configuration manager 301. The space configuration manager 301 is also operational over a network, which is wired, wireless, or a combination of wired and wireless. Example processing associated with the space configuration manager 301 was presented above in detail with reference to the FIGS. 1 and 2 (space configuration manager and space controller, respectively).

The space configuration manager 301 is configured to interact with devices that control physical space within a building to custom and to automatically redefine that physical space.

According to an embodiment, the space configuration manager 301 is further configured to interact with other devices that control physical attributes of the physical space to automatically adjust those physical attributes.

Continuing with the previous embodiment and in some situations, the physical attributes include one or more of: configurations of media devices located throughout the physical space, lighting within the physical space, temperature settings within the physical space, audio selections within the physical space, and blind adjustments from blinds on windows within the physical space.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in memory and/or a non-transitory computer-readable medium and to execute on one or more processors configured to execute the method, comprising:
   receiving, via the one or more processors, an instruction to configure a physical space having multiple walls into a target configuration from an existing configuration;
   directing, via the one or more processors, devices associated with the walls to move selective walls along tracks to achieve the target configuration; and
   instructing, via the one or more processors, media devices embedded in or affixed to portions of selective walls to present custom information consistent with the target configuration.

2. The method of claim 1 further comprising, adjusting, via the one or more processors, lighting associated with the target configuration within the physical space.

3. The method of claim 1 further comprising, initiating, via the one or more processors, audio selections associated with the target configuration within the physical space.

4. The method of claim 1 further comprising, altering, via the one or more processors, blinds associated with the target configuration and on selective outwardly facing windows of the physical space.

5. The method of claim 1, wherein receiving further includes obtaining the instruction from an automated agent that triggers the instruction based on one or more of: a specific event and a specific date and time.

6. The method of claim 1, wherein receiving further includes obtaining the instruction via a user via a graphical user interface where the user defines the target configuration.

7. The method of claim 1, wherein receiving further includes obtaining the instruction via a user via a graphical user interface where the user selects the target configuration from a list of available configurations.

8. The method of claim 7, wherein obtaining further includes acquiring the target configuration as a modification made by the user to a selected configuration from the list.

9. The method of claim 1, wherein instructing further includes initiating selective services that are interactively available to consumers via the media devices as defined by the target configuration.

10. The method of claim 9, wherein initiating further includes configuring the media devices for security restrictions with the respect to the selective services based on the target configuration.

11. The method of claim 1, wherein instructing further includes configuring each media device to present different information from remaining ones of the media devices.

12. A processor-implemented method programmed in memory and/or a non-transitory computer-readable medium and to execute on one or more processors configured to execute the method, comprising:
   instructing, via the one or more processors, devices that control walls of a physical space to reconfigure from a source state to a target state; and
   configuring, via the one or more processors, media devices within the physical space to a media state consistent with the target state.

13. The method of claim 12, wherein instructing further includes obtaining the target state via a front-end interface.

14. The method of claim 13, wherein obtaining further includes providing the front-end interface as an Application Programming Interface (API).

15. The method of claim 13, wherein obtaining further includes providing the front-end interface as a mobile device app.

16. The method of claim 13, wherein obtaining further includes providing the front-end interface as a graphical user interface.

17. The method of claim 12, wherein instructing further includes identifying the target configuration based on a specific business using the physical space on a specific date and at a specific time of day.

18. A system comprising:
   memory configured with a space configuration manager represented as executable instructions that execute on one or more processors;
   wherein the space configuration manager is configured to interact with devices that control walls of physical space within a building to custom and to automatically redefine that physical space.

19. The system of claim 18, wherein the space configuration manager is further configured to interact with other devices that control physical attributes of the physical space to automatically adjust those physical attributes.

20. The system of claim 19, wherein the physical attributes include one or more of: configurations of media devices located throughout the physical space, lighting within the physical space, temperature settings within the physical space, audio selections within the physical space, and blind adjustments from blinds on windows within the physical space.

* * * * *